United States Patent
Mirara

[15] 3,651,846
[45] Mar. 28, 1972

[54] AUTOMATIC HEN'S EGG PROCESSING APPARATUS

[72] Inventor: Masao Mirara, Yokohama, Japan

[73] Assignee: Kabushiki Kaisha Sango, Yokohama, Kanagawa, Japan

[22] Filed: Mar. 5, 1970

[21] Appl. No.: 16,893

[30] Foreign Application Priority Data

Oct. 31, 1969 Japan..................................44/87420

[52] U.S. Cl. .............................................................146/2 C
[51] Int. Cl. ..................................................................A47j 43/13
[58] Field of Search ................................................146/2 C

[56] References Cited

UNITED STATES PATENTS

| | | | |
|---|---|---|---|
| 2,229,349 | 1/1941 | Sigler | 146/2 C |
| 3,448,782 | 6/1969 | Williams | 146/2 C |
| 1,997,881 | 4/1935 | Drexel | 146/2 C |

Primary Examiner—Willie G. Abercrombie
Attorney—Holman, Glascock, Downing and Seebold

[57] ABSTRACT

An automatic hen's egg processing apparatus which comprises a framework; a cam shaft journaled in said framework and having an egg feeder actuating cam, a hammer blade opening and closing cam and a hammer blade driving cam; an egg feeder having an actuating bar; an egg receiving section adapted to open sideways in opposite directions; an egg holding down member having an actuating bar; a hammer having blades adapted to move toward and away from each other and vertically in unison; and a link mechanism operably related to the various cams and their related operation bars for performing a processing operation on one egg at one time.

2 Claims, 16 Drawing Figures

CHUTE FOR PURE YOKE

AUTOMATIC HEN'S EGG PROCESSING APPARATUS

BACKGROUND OF THE INVENTION

There have been proposed various types of hen's egg processing apparatus and in one type of processing apparatus the shell of an egg is cracked by swinging the egg around and forcing the contents through a crevice formed in the shell due to the cracking in a receptacle by means of centrifugal action and therefore, such a conventional egg processing apparatus can not automatically separate the thus forced-out egg contents into the yolk portion and glair portion. Another type of conventional hen's egg processing apparatus is provided with a blade in an egg receptacle which is adapted to open sideways in opposite directions and an egg is dropped over the blade to crack the shell of the egg at the bottom thereof utilizing the impact force generated by the dropping of the egg and thereafter, the receptacle is forced to widen to allow the contents of the egg to flow through a crevice formed in the cracked shell by gravity. However, both of the above-mentioned conventional hen's egg processing apparatus are complicated in construction and in addition, there is no assurance that eggs will drop in a predetermined desired disposition over the blade in which the longitudinal axes of the eggs lie in a horizontal plane and that the eggs will be cracked in a similar manner. Furthermore, there will be the possibility that the yolks of the eggs will not be extracted in their solid or perfect form.

SUMMARY OF THE INVENTION

The present invention relates to an automatic hen's egg processing apparatus in which cracking of the shell of a hen's egg and the separation of the contents thereof into the yolk portion and glair portion can be automatically performed.

One object of the present invention is to provide an automatic hen's egg processing apparatus which overcomes the above and other disadvantages existing in the art.

Another object of the present invention is to provide an automatic hen's egg processing apparatus in which the shells of a supply of hen's eggs which have been fed into the apparatus along a guide are cracked and the crevices formed in the cracked egg shells are forced to widen to allow the contents of the eggs to flow through the widened crevices by gravity while the contents are being separated into the yolk and glair portions.

According to the present invention, there is provided an automatic hen's egg processing apparatus which comprises a framework; a transverse cam shaft rotatably supported at the opposite ends in said framework and having an egg feeder actuating cam, a hammer opening and closing cam and a hammer driving cam fixedly mounted thereon and having open and closed positions; an egg supply means; an egg support means pivoted to the discharge end of said egg supply means for supporting one egg at a time thereon; a pivotal egg feeder disposed above said egg support means for receiving one egg at a time from said egg support means for receiving one egg at one time from said supply means and feeding said egg onto said support means, said egg feeder being adapted to be operated from said feeder cam through an actuating bar; an egg holding down piece movably disposed above said feeder for being pivotally operated by said feeder actuating cam through a second actuating bar; a hammer movably disposed below said egg support means and having a pair of blades at one end to be operated by said hammer opening and closing cam through a third actuating bar for vertical cam and opening and closing movement; said hammer blades further being driven into said egg supported on said egg support means in their upward stroke in the vertical movement by said hammer driving cam and in which the phase relation of said cams is so selected that upon operation of said feeder cam, said feeder feeds one egg onto said egg support means and at the same time, said holding down piece holds down said egg from above, after which upon operation of said hammer driving cam, said hammer is actuated to cause its blades into said egg while maintaining the blades in their closed position and finally, upon operation of said hammer opening and closing cam, said blades and egg support means are forced to open.

The above and other objects and attendant advantages of the present invention will be more readily understood from a reading of the following description in conjunction with the accompanying drawings.

PREFERRED EMBODIMENTS OF THE INVENTION

Figure 1:
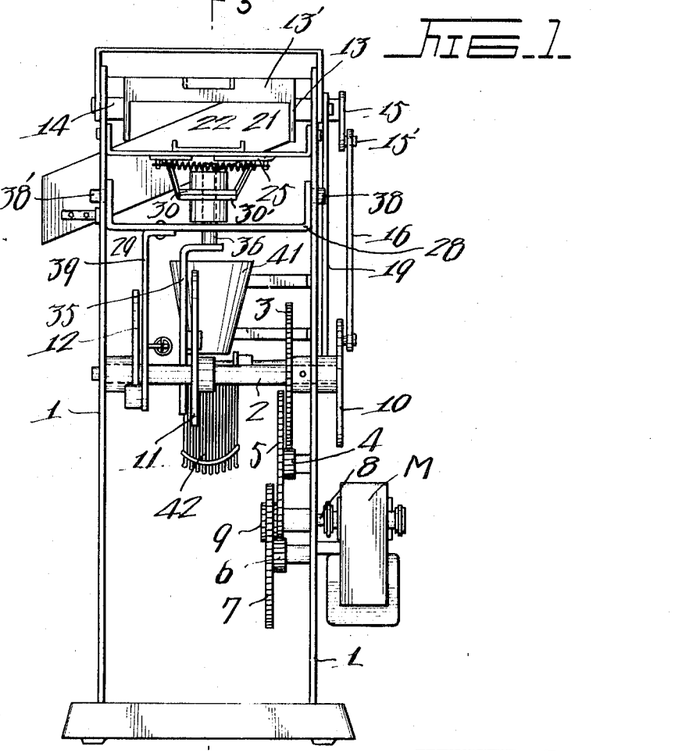
FIG. 1 is a front elevational view of a preferred form of automatic hen's egg processing apparatus according to the present invention.
Figure 2:
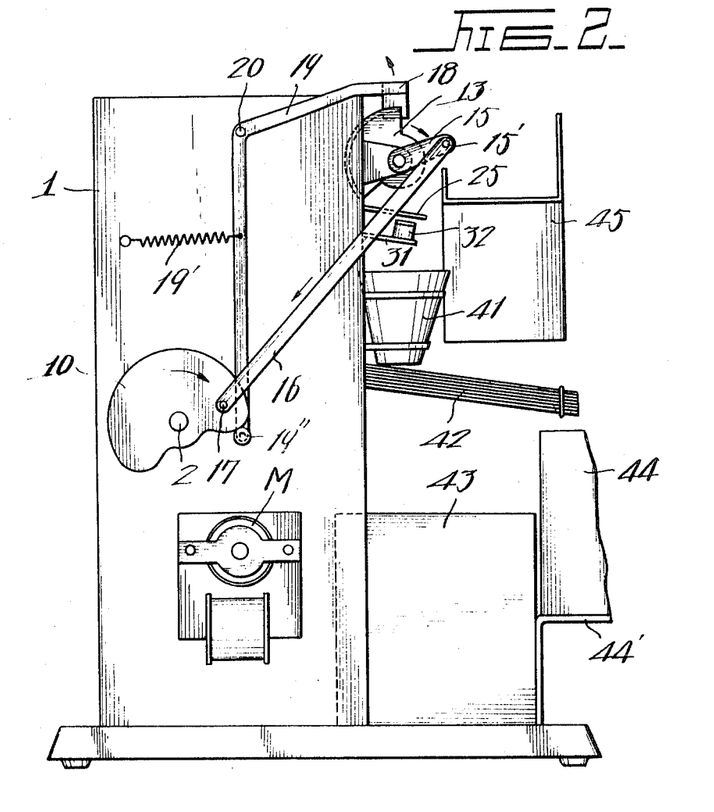
FIG. 2 is a side elevational view of said automatic hen's egg processing apparatus of FIG. 1 showing the same with a portion thereof cut away.

The present invention will be now described referring to the accompanying drawings and more particularly, to FIGS. 1 to 9 inclusive in which a preferred embodiment of the invention is illustrated. The present automatic hen's egg processing apparatus generally comprises a framework 1 which supports the various parts of the apparatus. The framework 1 rotatably supports a transverse horizontally cam shaft 2 at a mid point between the top and base and between the opposite ends of the framework by means of suitable bearings (not shown) which are in turn suitably supported on the laterally spaced opposite sides of the framework 1. A gear 3 is fixedly mounted on the cam shaft 2 at a point between the opposite ends of the shaft and an intermediate gear 4 is fixedly supported on a stub shaft also rotatably supported on one side of the framework at a point below the cam shaft 2, with the gear 4 meshing with the gear 3. A second intermediate gear 5 is also fixedly mounted on the same stub shaft as the gear 4 and meshes with a third intermediate gear 6 fixedly mounted on a second stub shaft rotatably supported on the same side of the framework 1 at a point below the first stub shaft. A fourth intermediate gear 7 is also fixedly mounted on the second stub shaft and a conventional motor M is mounted on and externally of the same side of the framework 1 with output shaft 8 of the motor extending through the framework side into the framework a gear 9 is fixedly mounted on the extended end of the motor output shaft 8 and is in mesh with the fourth intermediate gear 7. Thus, the cam shaft 2 is driven from the motor M through the output shaft 8 and the gear train 9, 7, 6, 5, 4 and 3. It will be seen that the cam shaft 2 projects at one end or the right end as seen in FIG. 1 through the adjacent side of the framework 1 and the projecting end has a semicircular cam 10 fixedly secured thereto for operating a hen's egg feeder and the cam has a noncircular peripheral portion the purpose of which will be later described. The cam shaft 2 also fixedly supports a hammer opening and closing cam 11 at a point between the opposite ends thereof and a hammer driving cam 12 on the side of the hammer opening and closing cam 11 opposite to the cam 10. As illustrated in FIGS. 1 and 2, a hollow sector-shaped egg feeder 13 is fixedly mounted on a transverse shaft 14 rotatably supported at the opposite ends thereof by means of bearings (not shown) supported in outwardly extending brackets on the opposite sides of the framework 1 at a point above the cam shaft 2. The transverse shaft 14 projects at one end or the right end as seen in FIG. 1 through the adjacent side of the framework and the projecting end has an arm 15 fixedly secured thereto. The arm 15 is connected to the semicircular cam 10 by means of a link 16 one end of which is pivoted to a pin 15' on the arm 15 whereas the other end of the link is pivoted to a pin 17 on the semicircular cam 10. An egg holding down member 18 is disposed above the egg feeder 13 and is supported at the upper end of a bent support arm 19 which is pivoted on a pin 20 mounted on the outer side of the side of the framework 1 mounting the motor M. A coil spring 19' is anchored at one end to the support arm 19 below the pivot point 20 while the other end of the spring is anchored to the adjacent side of the framework 1 to normally urge the support arm and accordingly, the holding down member 18 thereon rearwardly. The support arm 19 has a cam follower 19'' at the lower end thereof for riding along the peripheral surface of the semicircular cam 10 in rolling contact therewith.

Figure 3:
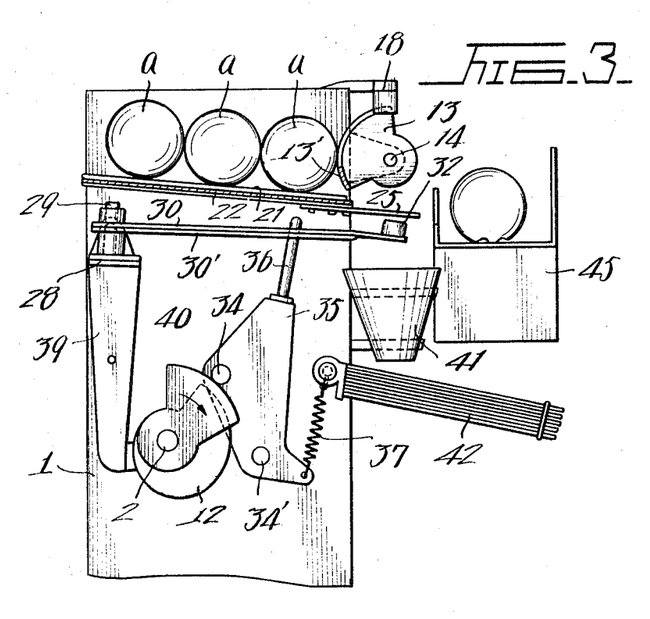
FIG. 3 is a side elevational view in section taken along substantially the line 3—3 of FIG. 1 and seen in the arrow direction.
Figure 4:
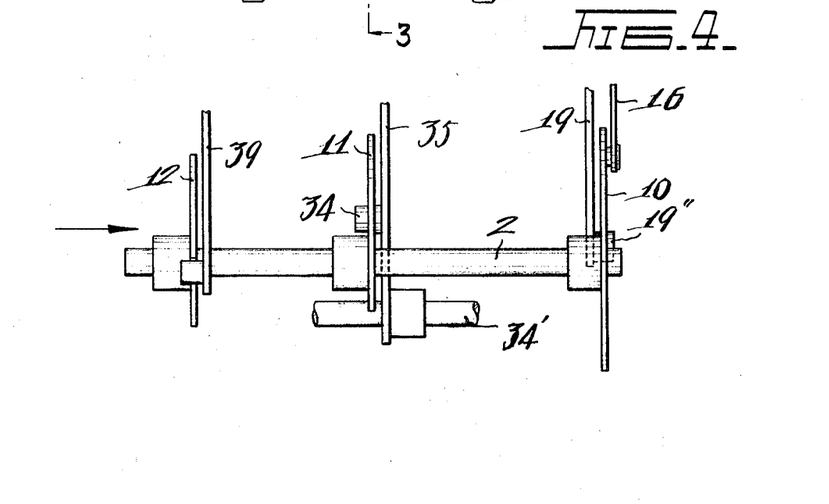
FIG. 4 is an enlarged front elevational view of a cam mechanism which drives various moving parts of said hen's egg processing apparatus.
Figures 6A, 6B:
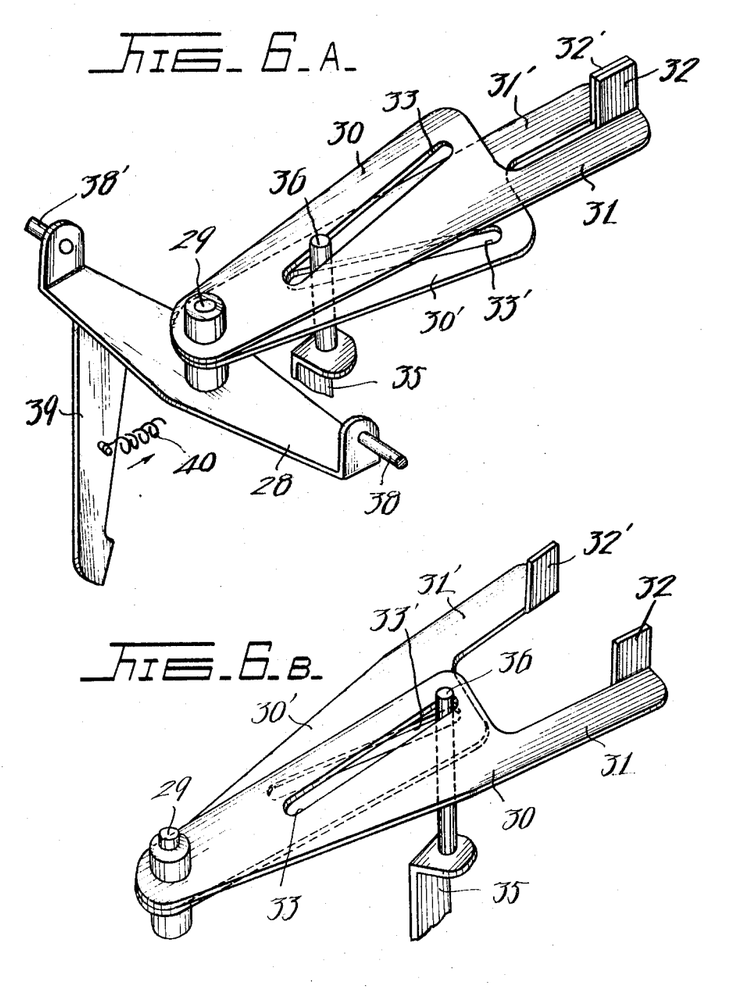
FIG. 6A is a further enlarged perspective view of a hen's egg shell cracking and crevice widening hammer and its actuating mechanism showing the hammer in its closed condition.
FIG. 6B is similar to FIG. 6A, but shows the hammer in its open condition.
Figure 9:
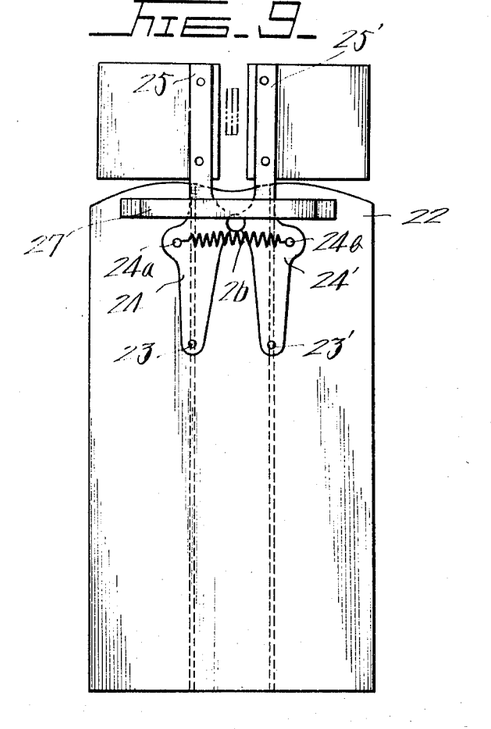
FIG. 9 is a reverse plan view of a hen's egg supporting means.

As clearly illustrated in FIGS. 1 and 3, an egg feed chute 22 which inclines towards the forward end and has a guide 21 on the upper surface thereof extends from one end of the framework 1 through the other end at a point below the egg feeder 13 for receiving a supply of hen's eggs *a* to be processed from a hopper positioned above the chute (not shown). The guide 21 terminates at its forward end short of the forward end of the chute 22 and serves to orient the eggs *a* in side by side relation with their longitudinal axes maintained horizontal. The eggs *a* from the hopper which are supplied into the guide 21 on the chute 22 with their longitudinal axes disposed horizontal and first roll down along the guide rail by their own gravity with the opposite ends of each of the eggs *a* keeping a sliding contact with the side walls of the guide 21 and then drop onto the chute 22 and roll down along the chute. The leading one of the eggs *a* reaches the egg feeder 13 which feeds one egg at a time as the feeder rotates one complete revolution and the holding down member 18 holds the thus fed leading egg with a slight force in a manner to be later described. In FIG. 9, it will seen that the forward end portion of the chute 22 has, on the bottom surface, a pair of jaws 24, 24' pivoted thereto by means of a pair of pins 23, 23' for opening and closing movement and the jaws have cooperating egg support fingers 25, 25', respectively which extend beyond the forward end of the chute 22. The egg support fingers 25, 25' are adapted to maintain an opening between their inner edges even when they are in the closed position for a purpose to be subsequently described. A coil spring 26 is anchored at one end to a pin 24a on the jaw 24 and at the other end to a pin 24b on the jaw 24' for normally holding the fingers 25, 25' in the closed position. A guide 27 is adapted to assist the jaws 24, 24' in their proper opening and closing movement and a rocking plate 28 is provided in the center of its upper surface with a pin 29 (FIG. 6) on which the rear end of a hammer to be later described is pivotally supported for opening and closing movement about the pin 29. With reference to FIGS. 6A and 6B, it will be noted that the hammer comprises a pair of substantially sector-shaped plate members 30, 30' disposed in overlapping and having arms 31, 31' at the free ends, respectively, for opening and closing movement in a scissor-like manner. The arms 31, 31' of the plate members 30, 30' have upright blades 32, 32' at their free ends along the inner side edges, respectively. The plate members 30, 30' are provided with inclined slots 33, 33', respectively, disposed at an angle with respect to the plane of their respectively associated plate members and diverge from their rear ends where the slots communicate with each other towards the forward ends. A pin 34 is adapted to ride along the peripheral surface of the cam 11 and the pin 34 is provided on a rocking member 35 fixedly mounted on a transverse rotary shaft 34' suitably and rotatably supported on the framework 1. The rocking member 35 has, at the upper end, a rod 36 which extends upwardly through the communicating rear ends of the slots 33, 33'. The rocking member 35 is provided with a coil spring 37 anchored to its lower end while the other end is anchored to a pin provided on one side of the framework 1 in a suitable manner for normally urging the rocking member 35 to its retracted or lowered position. As illustrated in FIG. 6A, the opposite ends of the hammer supporting rocking plate 28 have pins 38, 38', respectively, projecting outwardly of the respectively adjacent ends of the rocking plate and rotatably supported in the opposite sides of the framework 1. An eccentric arm 39 depends from the bottom surface of the rocking plate 28 at a point adjacent to the left end thereof and a coil spring 40 is anchored at one end to the depending arm and at the other end to the adjacent side of the framework 1 so that the arm will be normally urged against the hammer driving cam 12 by the force of the spring. As best illustrated in FIGS. 1–3, a funnel-type guide member 41 is supported by brackets on the framework 1 immediately below the hammer arms 31, 31' and an egg content separation trough 42 is disposed below the funnel-type guide member 41. The egg content separation trough 42 is supported at one end on the pin to which the other end of the spring 37 is anchored while the other end of the separation trough is supported by suitable means (not shown). The separation trough 42 comprises a plurality of wires which are arranged in spaced and aligned relationship in the vertical and transverse directions and inclines towards the forward end. The trough 42 is adapted to separate the content of an egg into glair and yolk portions. The separate portion drips downwardly through the spaces between the adjacent wires aligned in the vertical and transverse directions while the separated portion slides down along the wires towards the forward or discharge end of the trough 42. It will be noted that an egg glair receptacle 43 is disposed immediately below the separation trough 42 and supported on the base of the apparatus. The glair receptacle 43 is adapted to receive and hold the separated egg glair falling downwardly through the spaces between the adjacent aligned wires of the separation trough 42. A yolk receptacle 44 is disposed immediately below the forward or discharge end of the separation trough 42 and supported on a bracket 44' mounted on the base and secured to the glair receptacle 43 for receiving the yolk which was separated from the glair by the separation trough 42. Disposed adjacent to the forward or discharge end of the egg feed chute 22 is an empty egg shell discharge trough 45 adapted to receive and discharge scrap shells which have been cracked and their contents removed therefrom.

Figure 5:
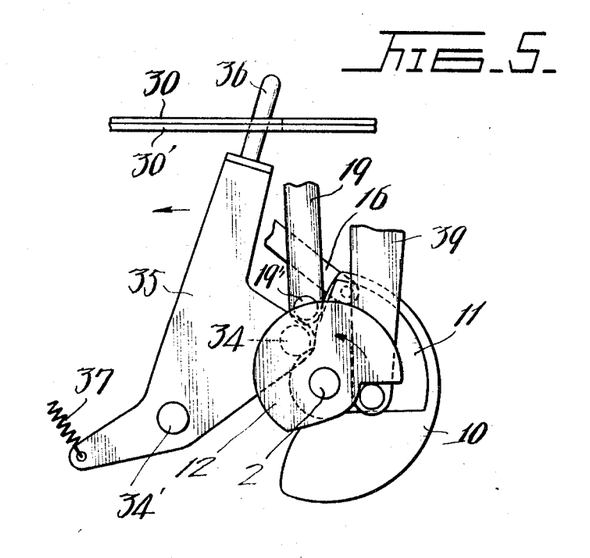
FIG. 5 is a side elevational view of said cam mechanism as seen in the arrow direction of FIG. 4.
Figure 7A:
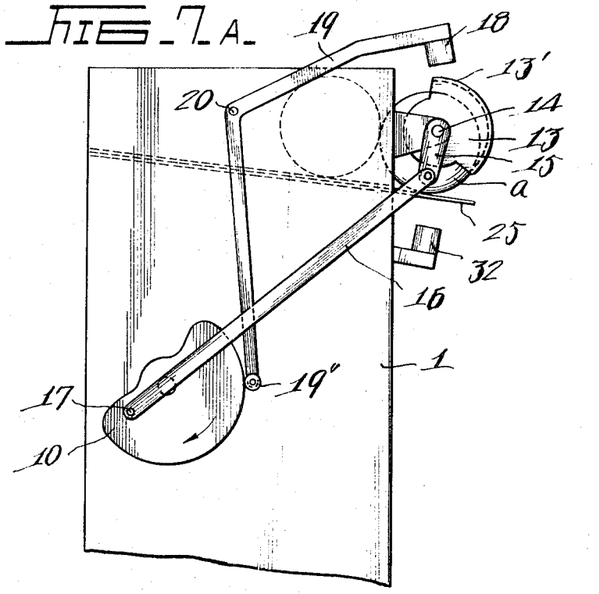
FIG. 7A is a view showing the relationship between said hammer, its actuating mechanism, a hen's egg feeder and a cam therefor showing these parts when the feeder has received one egg therein.
Figure 7B:
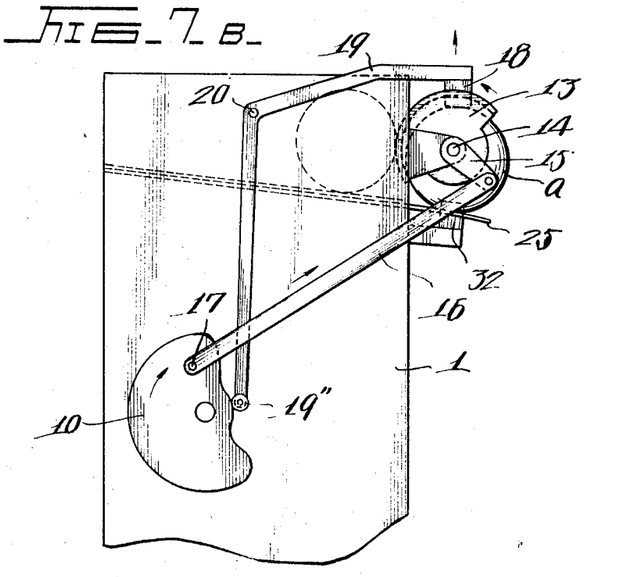
FIG. 7B is similar to FIG. 7A, but shows these parts when the hammer has applied a striking or shell cracking force against the hen's egg received in the feeder.
Figure 8A:
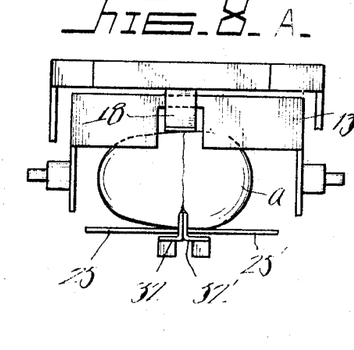
FIG. 8A is a view showing one hen's egg immediately after the egg has been applied a shell cracking force thereagainst by said hammer.
Figure 8B:
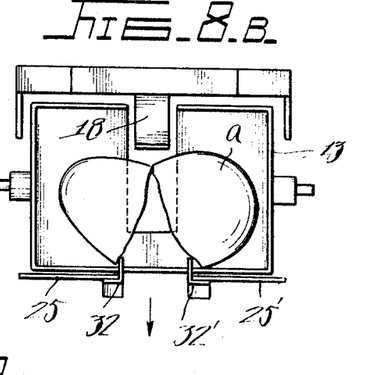
FIG. 8B is similar to FIG. 8A, but shows the hen's egg after the crevices formed in the shell thereof have been forced to widen.

In operation, it is assumed that the egg feeder 13 is in the position as shown in FIGS. 2 and 3 in which the open side 13' of the feeder faces forwardly and a batch of eggs *a* to be processed having the longitudinal axes thereof positioned horizontal are received in the feed chute 22 in side by side relation with the leading one abutting against the closed side of the feeder 13, and then the motor M is energized from a suitable drive source (not shown). Upon the energization of the motor, the cam shaft 2 is driven in the arrow direction (FIGS. 2 and 3) from the motor M through the motor output shaft 8 and the gear train 9, 7, 6, 5, 4 and 3. When the cam shaft thus driven, the link 16 pivoted at one end to the pin 17 on the semicircular cam 10 is pulled down in the arrow direction (FIG. 2) whereupon the arm 15 pivoted to the other end of the link 16 is rotated in the arrow direction (FIG. 2). The rotation of the arm 15 in the arrow direction rotates the feeder 13 in the arrow direction (FIG. 2) until the open side 13' thereof assumes the position as shown in FIG. 7A whereupon the leading egg which now abuts against and held against movement by the feeder 13 is allowed to roll down by gravity onto the now closed support fingers 25, 25' of the jaws 24, 24' where the egg is partially received in the feeder 13. As the cam shaft 2 and accordingly, the cam 10 continues to rotate, the link 16 rotates the arm 15 to the position as shown in FIG. 7B to rotate the feeder 13 by a small angular distance in the reverse direction as shown in FIG. 7B. Simultaneously, the cam follower 19" which now contacts the arcuate peripheral portion of the cam 10 frictionally rolls to the noncircular peripheral portion of the cam 10 whereupon the egg holding down element 18 is pushed downwardly against the top of the egg and holds the egg within the feeder 13 with a slight force from above. Simultaneously, the rod 36 projecting from the upper end of the rocking member 35 which contacts the cam 11 by means of its pin 34 retreats along the slots 33, 33' in the hammer plate members 30, 30' to the rear extreme ends of these slots to bring the blades 32, 32' together as seen in FIG. 6A. Since the lower end of the depending arm 39 on the bottom surface of the rocking plate 28 abuts against the hammer driving cam 12 by the force of the spring 40, as the cam shaft 2 and the cam 12 thereon is rotated in the manner mentioned above, the depending arm 39 is suddenly pulled downward by the spring 40 whereupon the rocking plate 28 is caused to rock in the arrow direction (FIG. 6A) with the shafts 38, 38' as the fulcrums. Upon such rocking movement of the rocking plate 28 the blades 32, 32' supported on the rocking plate are suddenly pushed upwardly through the opening defined by the egg support fingers 25, 25'. As the blades 30, 30' are pushed upwardly, the blades strike against the egg a which is now positioned on the support fingers 25, 25' striding the opening therebetween from the underside thereof to break into the shell of the egg as shown in FIGS. 7B and 8A. Under these conditions, the various cams assume the positions as shown in FIG. 5. Upon further rotation in the arrow direction of the cam shaft 2, the rod 36 at the upper end of the rocking member 35 is forced to move back along the slots 33, 33' to the communicating rear ends of the slots.

This is due to the fact that the pin 34 on the rocking member 35 moves along the periphery of the cam 11 in the arrow direction as shown in FIG. 3 and the movement of the rod 36 towards the rear ends of the hammer plate member slots separates the blades 32, 32' which have been driven in the egg a from each other as shown in FIG. 6B. Hence, the separating blades 32, 32' force to open wide the egg or more particularly, the crevice formed at the bottom of the egg shell and at the same time causes the jaws 24, 24' to pivot about their pivot pins 23, 23' against the force of the spring 26 to separate the egg support fingers 25, 25' from each other. Thus, the contents of the egg or the integral yolk and glair is allowed to flow out of the inside of the shell through the now widely opened crevice in the lower portion of the shell into the funnel-type guide 41 and then onto the separation trough 42 positioned immediately below the guide 41. The glair portion of the integral egg content then flows down through the spaces between the wires of the separation trough 42 while being separated from the yolk. The thus separated glair portion flows down into the glair receptacle 43 while the yolk portion slides down along the inclined wires to the forward or lower end of the trough from whence the yolk portion flows down into the yolk receptacle 44 just below the fore end of the trough 42. At the same time, the hammer driving cam 12 is also rotated until the lower end of the arm 39 moves from the non-arcuate peripheral portion of the cam 12 to the arcuate peripheral portion thereof. As a result, the lower end of the arm 39 is pulled up and the rocking plate 28 is rocked in the reverse direction to push the hammer up at its rear end thereby causing the blades 32, 32' to descend until the blades clear the opening between the egg support fingers 25, 25' and the crevice formed in the egg shell. As the cam shaft 2 is rotated in the arrow direction above mentioned the semicircular cam 10 thereon is also rotated in the arrow direction to pull the link 16 pivoted thereto. When the semicircular cam 10 has rotated to bring the link 16 to the position as shown in FIG. 7B, the link would have rotated the egg feeder 13 to the position of FIG. 7B in which the open side 13' of the feeder receives and temporarily holds the next leading egg from the chute 22. Simultaneously, the cam follower 19" at the lower end of the support arm 19 rides on the arcuate peripheral portion of the cam 12 to push the egg holding down member 18 upwardly in the arrow direction in FIG. 7B and the cracked and emptied egg shell a' is allowed to be discharged into the shell discharge chute 45 to complete a cycle of operation for one egg. The same procedure can be repeated on the succeeding eggs.

Figure 10:
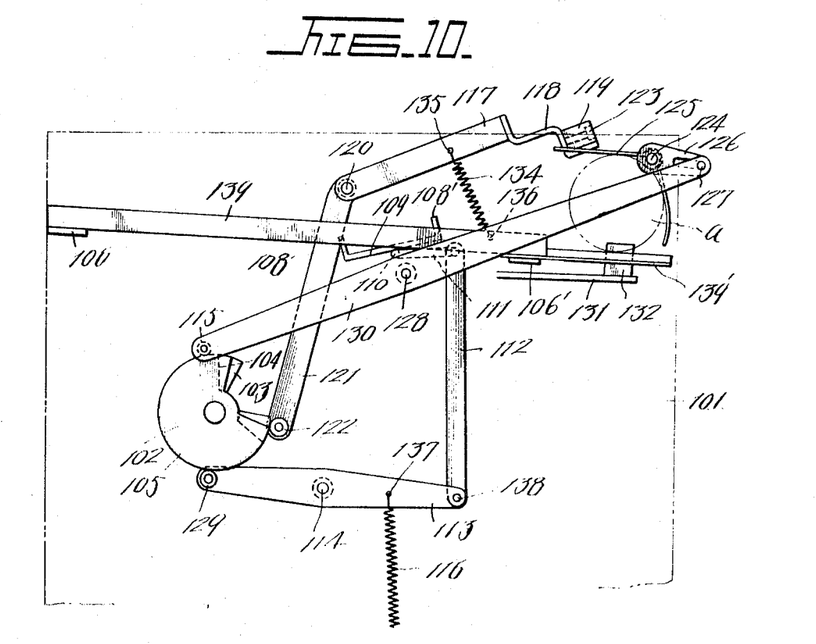
FIG. 10 is a side elevational view of a modified hen's egg guide mechanism.
Figure 11:
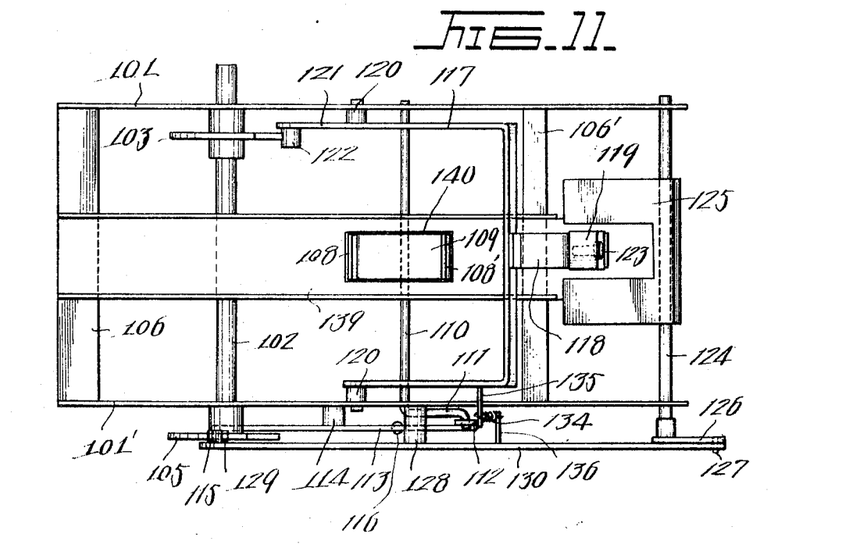
FIG. 11 is a top plan view of said modified hen's egg guide mechanism.
Figure 12:
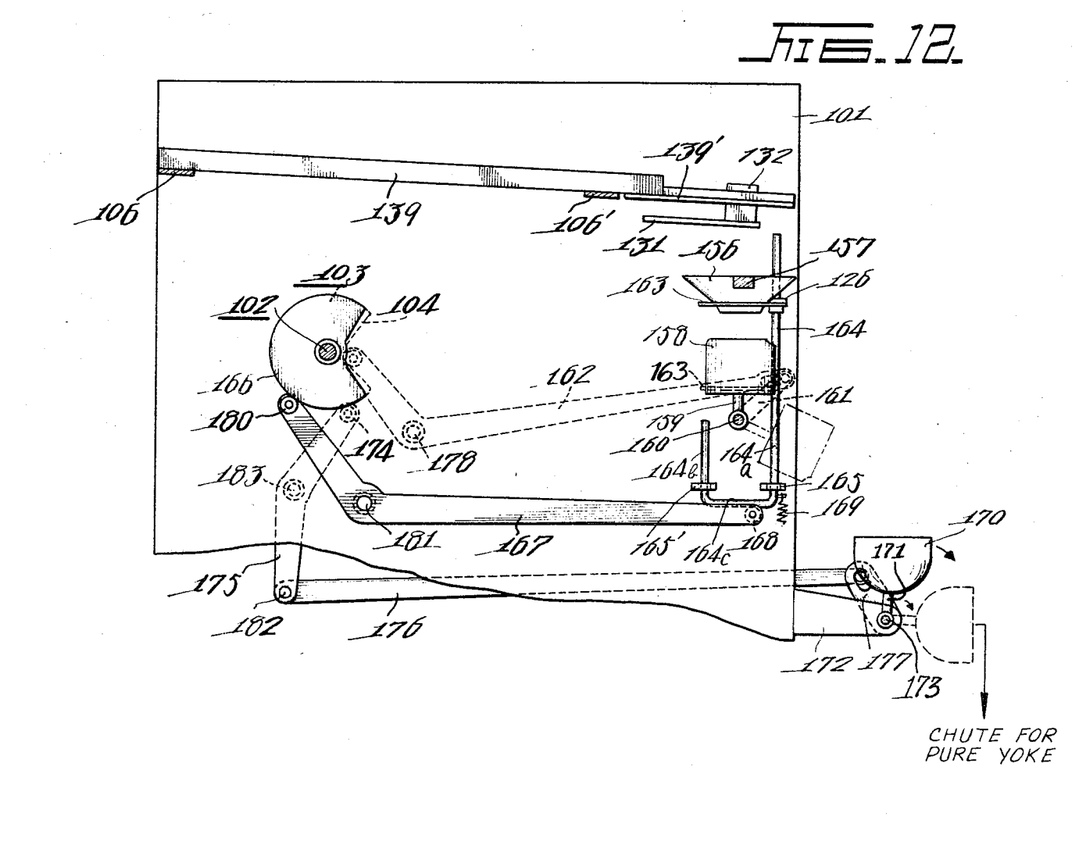
FIG. 12 is a side elevational view of a modified mechanism which is adapted to separate the glair and yolk portions of one hen's egg from each other.
Figure 13:
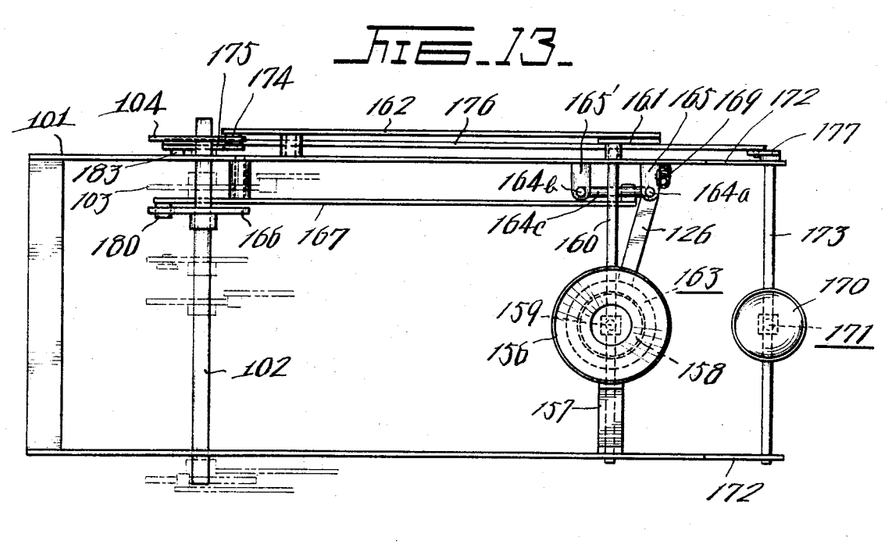
FIG. 13 is a top plan view of said mechanism shown in FIG. 12.

FIGS. 10 and 13 inclusive show a modified embodiment of the present invention. This embodiment is different from the preceding embodiment in the provision of a modified mechanism adapted to crack the shell of an egg and discharge the contents of the egg and the cracked and emptied shell from the system.

The modified embodiment is substantially identical with that of FIGS. 1–9 except the mechanism, referred to in the preceding paragraph, and accordingly the description of the modified embodiment will be made on only the modified mechanism and its relates parts while description of parts corresponding to those of the preceding embodiment are eliminated.

An egg feed chute 139 which extends longitudinally of the apparatus with a slight inclination angle is supported adjacent to the opposite ends on a pair of spaced transverse support members 106, 106' suitably secured to the framework 101 at different heights. The chute 139 terminates at one end short of the adjacent end of the framework and is formed with a rectangular opening 140 at an intermediate point between the opposite ends. The chute 139 has egg support means pivoted to the underside thereof extending beyond the discharge end and the support means are identical with the pivoted and spring-loaded jaws 24, 24' and egg support fingers 25, 25'.

It will be noted that the egg support means is generally indicated 139' in FIGS. 10 and 12. A stop plate 109 is received within the opening 140 is fixedly mounted on a transverse rocking shaft 110 rockably supported at the opposite ends in the framework 101 and adapted to be driven by a drive means to be later described. The stop plate has a rectangular shape slightly smaller than the opening 140 and is provided at the opposite ends with upright pieces 108, 108' adapted to alternately enter and leave the opening 140 as the shaft 110 rocks. When the upright piece 108' projects above the opening 140 as shown in FIG. 10, the leading one of a supply of eggs being fed is engaged by the upright piece 108' and supported on the stop plate 109. As the transverse shaft 110 and accordingly, the stop plate 109 is further rocked until the other upright piece 108 projects in turn above the opening 140 while the upright piece 108' descends below the opening 140, the egg which is now supported on the stop plate 109 is fed onto the egg support means 139' projecting beyond the discharge end of the chute 139. Thereafter, when the shaft 110 and accordingly, the stop plate 109 is again rocked to cause the upright piece 108' below the opening 140 to project above the opening 140 again while lowering the upright piece 108 below the opening, the next leading egg which is engaged and held by the upright piece 108 is received and supported on the stop plate 109.

When the rocking shaft is rocked again to cause the upright piece 108' which now projects above the opening 140, the next leading egg on the stop plate 109 is fed onto the egg support means 139'. The same procedure will be repeated for the succeeding eggs of the supply. The egg supported on the egg support means 139' is engaged and held by an elastic abutment 125 of substantially U-shape as seen from above which is positioned adjacent to and immediately above the discharge end of the egg engaging means 139'. In this position of the egg, an egg holding down member 119 (to be hereinafter described) is pivoted downwardly toward the egg to down the egg.

Upon the egg being held down by the member 119, the hammer is actuated to cause its blades to spring up through the opening in the egg support means 139' to strike against the egg at the bottom so as crack the bottom of the egg shell. The construction and arrangement with respect to the egg support means 139' and operation of the hammer 131 is identical with the corresponding components illustrated in FIGS. 1-9. As in the preceding embodiment, the hammer 131 is provided with a pair of upright blades 132 and 132. The rocking movement of the stop plate 109 is effected by the notched cam 105 fixedly mounted on a transverse cam shaft 102. For the purpose, a cam follower 129 adapted to contact the notched cam 105 is rotatably mounted on a pivotal member 113 pivoted at 114. A pin 137 is mounted on the pivotal member 113 and a spring 116 is anchored at one end to the pin while the other end of the spring is suitably anchored to the frame work (not shown). The spring 116 normally urges the cam follower 129 against the notched cam 105. A connecting rod 111 is suitably connected to the stop plate 109 and the connecting rod 111 is connected by another connecting rod 112 to the pivotal member 113. With the above arrangement, as the notched cam 105 is rotated, the pivotal member 113 and connecting rods 111 and 112 are successively moved to rock the stop plate 109 back and forth. In FIG. 10, a pin 138 provides the connection between the connecting rods 111 and 112. The pivotal movement of the elastic abutment 125 and movement of the egg holding down member 109 toward and away from the egg are effected by the notched cams 103 and 105 fixedly mounted on the transverse cam shaft 102.

The notched cam 103 is engaged by a cam follower 122 rotatably supported at the lower end of a substantially L-shaped lever 121 pivoted to the framework 101 by means of a pin 120 and a double-bent member 118 is secured to the upper end of the lever 121. The free end of the double-bent member 118 has the member 119 secured thereto by means of a set screw 123. One or upper leg portion 117 of the L-shaped lever has a pin 135 and one end of a coil spring 134 is anchored to the pin 135. The other end of the coil spring 134 is anchored to a pin 136 on an abutment actuating bar 130 adapted to operate the abutment 125 in a manner to be subsequently set forth. Thus, when the cam shaft 102 and accordingly, the notched cam 103 is rotated, the cam follower 122 rolls along the periphery of the cam to cause the L-shaped lever 121 to pivot upwardly and downwardly about the pin 120. The upward and downward pivotal movement of the lever 121 in turn moves the egg holding down member 119 downwardly and upwardly or toward and away from the egg supported on the egg support means 139' whereby the egg is held and released by the holding down member 119.

The notched cam 105 is engaged by a cam follower 115 rotatably supported at the lower end of the abutment actuating bar 130 by the force of the coil spring 134 acting on the bar. The upper end of the abutment actuating bar 130 is pivoted to a link 126 by means of a pin 127 and the link is mounted on a transverse shaft 124 whose the opposite ends are suitably supported in the framework 101. The elastic abutment 125 is also supported at a midpoint between the opposite ends on the transverse shaft 124. The abutment actuating bar 130 is pivoted to a pin 128 supported in the framework at a midpoint between the upper and lower ends of the abutment actuating bar for pivotal movement about the pin. The cracked egg shell from which the contents have been removed by the use of the hammer 131 which is identical will be discharged from the system by the elastic abutment 125 when the abutment is rotated in the counterclockwise direction as seen in FIG. 10 by the abutment actuating bar 130.

After the egg a has its shell cracked in the same manner as described in connection with FIGS. 1-9, same manner as, the egg contents are allowed to fall downwardly into a funnel-shaped guide 156 positioned immediately below the egg support means 139'. The guide 156 is fixedly supported on a support arm 157 suitably secured to the framework 101 and the egg contents then fall through the guide 156 downwardly into a tumbling egg contents receiving cup 158 positioned immediately below the funnel-shaped guide 156. The receiving cup 158 has a depending bar 159 extending from the bottom thereof and the bar has a transverse ring-shaped lower end pivotally mounted on a transverse shaft 160 (FIG. 13) supported in the framework 101. The transverse shaft 160 has an arm 161 pivotally mounted thereon which is also pivoted at the other end to a cup actuating lever 162 by means of a pivot pin. The free end of the lever 162 is provided with a cam follower 179 for riding along a cam 104 fixedly mounted on the cam shaft 102 and the lever is pivoted at a midpoint between the opposite ends thereof by a pin 178.

The receiving cup 158 has a capacity such as to receive the yolk of only one egg and hence, a substantial portion of the glair which has fallen down onto the receiving cup together with the yolk is caused to overflow the cup. The overflowing glair is received on a vertically movable annular glair guide ring 163 which is then disposed around the cup 158. The glair guide ring 163 has an inner diameter slightly larger than that of the cup 158. The glair guide ring 163 is secured to a substantially U-shaped vertically movable bar member 164 movably supported in a manner to be later described and comprises a long vertical leg 164a, a short vertical leg 164b and an intermediate horizontal base 164c. The long and short legs 164a and 164b respectively guided in and along guide members 165, 165', suitably supported in the framework 101. The horizontal base 164c is engaged from below by a roller 168 rotatably supported at one end of a rocking lever 167. The other end of the lever 167 rotatably supports a cam follower 180 which rides along a notched cam 166 fixedly mounted on the cam shaft 102. A spring 169 is anchored at one end to the lower end of the long vertical bar leg 164a and the other end thereof is suitably anchored to the framework 101 for normally urging the bar 164 upwardly so that the ring 163 is positioned around the funnel-shaped guide as shown by the full line in FIG. 12. When the bar member 164 is moved downwardly until the ring 163 moves down from the full line position to the portion of the bottom edge of the cup 158 as shown in FIG. 12, the ring 163 cuts and separates the glair which has overflowed around the receiving cup 158 leaving only the yolk within the cup 158.

The glair which has overflowed the cup 158 flows downwardly along the ring 163 into trough positioned immediately below the cup (not shown) from which the glair is discharged into a separate glair receptacle (not shown). Although a small amount of glair which adheres to the yolk will remain in the cup 158, such amount of glair can be completely separated from the yolk in a tumbling yolk receptacle 170 having a capacity smaller than that of the cup 158 and sufficient to receive the yolk of one egg. It will be noted that the yolk receptacle 170 is positioned at a height lower than that of the cup 158 and has a short bar 171 depending from the bottom thereof. The lower end of the bar 171 is in the form of a ring pivotally mounted on a transverse shaft 173 journaled in a bracket 172 extending from the framework 101. The shaft 173 rotatably supports a link 177 pivoted to a link 176 provided at the other end thereof with a rotatably supported cam follower 174. The link 176 is pivotally supported at a midpoint between its opposite ends as shown at 183. The shaft 173 further rotatably supports a link 177 pivoted to a link 176 whose other end is pivoted at 182 to one end of a lever 175. The other end of the lever has a rotatably supported cam follower 174. The lever 175 is also pivoted at a midpoint between its opposite ends as shown at 183. The above described arrangement is so selected that during the cam 104 being rotated by the rotation of the cam shaft 102, when the cup 158 is turned upside-down, the receptacle 170 is brought immediately below the cup and stands upright with its open top facing upwardly whereby the yolk will fall downwardly into the receptacle 170 while the glair will overflow the receptacle. After having received the yolk therein, the receptacle 170 is then turned upside-down to allow the yolk to fall downwardly into a guide trough positioned adjacent to and immediately below the receptacle (not shown) and the glair falls downwardly into a separate guide trough positioned adjacent to and below the receptacle (not shown). When the receptacle is turned upside-down, the cup receptacle is returned to its normal upright position with its open top facing upwardly.

While preferred embodiments of the invention have been shown and described in detail it will be understood that they are for the illustration only and are not to be taken as a definition of the invention, reference being had for this purpose to the appended claims.

I claim:

1. An automatic hen's egg processing apparatus comprising a framework; a transverse cam shaft rotatably supported at the opposite ends in said framework; said transverse cam shaft having an egg feeder actuating cam, a hammer opening and closing cam and a hammer driving cam fixedly mounted thereon; a downwardly inclined egg supply means having a discharge end; an egg support means for opening and closing movement, said jaws in the closed position supporting one egg at a time; a pivotal egg feeder disposed above said egg support means for receiving one egg at a time from said supply means and feeding said egg onto said support means, an actuating bar operably related to said feeder actuating cam for operating said feeder actuating cam for operating said egg feeder; and egg holding down member movably disposed above said feeder for being pivotally operated by said feeder actuating cam through a second actuating bar; a hammer movably disposed below said egg support means, said hammer including a pair of overlapping arms pivotally mounted at one end for opening and closing movement, a blade for each arm adjacent the other end thereof extending normal to the arm, said pair of arms being capable of vertical movement, said pair of arms being adapted to be operated by said hammer opening and closing cam through a third actuating bar for said vertical movement and for said opening and closing movement, said blades being driven into said egg supported on said egg support means in their upward stroke in the vertical movement by said hammer driving cam, the phase relation of said cams being so selected that upon operation of said feeder actuating cam, said feeder feeds one egg onto said egg support means and at the same time, said holding down member holds down said egg from above, then, upon actuation of said hammer driving cam, said hammer is actuated so as to cause said pair of blades to drive into said egg while maintaining the blades in their closed position and finally, upon actuation of said hammer opening and closing cam, said blades and egg support means are forced to open.

2. An automatic hen's egg processing apparatus comprising a framework; a downwardly inclined egg supply chute having a discharge end fixedly supported by said framework; an elastic egg abutment pivotally disposed above and adjacent to the discharge end of said egg supply chute; an egg holding down member pivotally disposed above said abutment; an egg shell cracking mechanism disposed immediately below said egg holding down member, said cracking mechanism including a pair of overlapping arms pivotally mounted at one end for opening and closing movement, a blade for each arm adjacent the other end thereof extending normal to the arm, said mechanism being mounted for vertical movement; a trough disposed below said mechanism for receiving the glair portion of said egg the shell of which has been cracked by said blades; a tumbling egg yolk receiving cup disposed below said mechanism and adjacent to said trough; and a vertically movable annular ring adapted to encircle said cup and during vertical downward movement cut and separate a remaining portion of said egg glair which has overflowed around said cup.

* * * * *